United States Patent [19]
Herscovici

[11] 3,828,578
[45] Aug. 13, 1974

[54] U-JOINT LUBRICATION SPIDER

[75] Inventor: Saul Herscovici, Waterloo, Iowa

[73] Assignee: Deere & Company, Moline, Ill.

[22] Filed: May 10, 1973

[21] Appl. No.: 359,206

[52] U.S. Cl. .............................. 64/17 A, 184/105 R
[51] Int. Cl. .............................................. F16n 7/36
[58] Field of Search........... 64/17 A, 17 R; 184/1 R, 184/105 R, 105 B

[56] References Cited
UNITED STATES PATENTS

| | | |
|---|---|---|
| 1,673,399 | 6/1928 | Cutting .............................. 64/17 R |
| 2,439,569 | 4/1948 | Hathorn .............................. 64/17 A |
| 2,834,376 | 5/1958 | Hughes ........................... 184/105 R |
| 2,876,636 | 3/1959 | Thackeray .......................... 64/17 A |

*Primary Examiner*—Manuel A. Antonakas

[57] ABSTRACT

A universal joint spider includes a central recess which is in communication with bearing chambers contained on the outer end of each of the pins of the spider. Received in the recess is a lubrication selection member which is automatically movable to successively place individual bearing chambers in fluid communication with a grease inlet port so that the bearing chambers can be individually greased.

5 Claims, 9 Drawing Figures

3,828,578

U-JOINT LUBRICATION SPIDER

BACKGROUND OF THE INVENTION

This invention relates to universal joint spiders and more particularly pertains to universal joint spiders having means for individually lubricating the bearing chambers on the outer end of each of the pins of the spider.

Universal joint spiders are well known and generally comprise a central core member from which a plurality of pins, usually four, extends. A bearing housing, received over and surrounding the outer end of each pin, cooperates with its respective pin to form a bearing chamber for a plurality of bearings. Normally the bearings are lubricated or greased through lubricating ducts carried by each of the pins and which are in fluid communication with a common grease inlet port provided with a fitting for automatically accepting an external grease source.

In presently known spiders, grease flows from the grease inlet port concurrently into all of the lubricating ducts. Since grease takes the path of least resistance, all of the bearing chambers may not receive sufficient grease to properly lubricate the bearings. For example, it is commonly known that the various rubber seals used to seal the bearing chambers may have different coefficients of elasticity which may result in a variance in the pressure needed to push out old grease from the chamber. Also, dirt, water or any other contaminant may plug a bearing chamber or lubricating duct and hence prevent lubrication.

SUMMARY OF THE INVENTION

It is therefore an object of this invention to present a universal joint spider having an improved lubricating means.

It is still a further object of this invention to present a means for individually lubricating the bearing chambers of a universal joint spider.

A still further object is to present a universal joint spider provided with a central recess which receives a movable lubrication duct selection member which alternately, fluidly connects successive lubricating ducts with a grease inlet port while fluidly blocking the remaining lubricating ducts.

An additional object of this invention is to present a universal joint spider having a lubrication duct selection member which is automatically indexed to alternately, fluidly connect each successive duct to the grease inlet port.

Finally it is an object of this invention to present a universal joint spider including a lubrication selection member which is rotated relative to the core member of the spider by the cooperative efforts of a plunger and cam means to alternately, fluidly connect the lubricating ducts to an external grease source.

In accordance with the invention, a universal joint spider includes a core member having a central recess and a plurality of pins radiating outwardly from the core member, each carrying on its outer end a bearing chamber for receiving a plurality of bearings. A lubricating duct provided in each pin is adapted to convey lubricating fluid from the central recess to the bearing chamber. Received within the central recess of the core member is a lubrication duct selection member which is rotatable and reciprocable between first and second positions to alternately fluidly connect individual lubricating ducts with a grease inlet port while concurrently blocking the remaining lubricating ducts. Movement of the lubrication selection member is obtained by the cooperative efforts of a plunger member and cam surfaces.

BRIEF DESCRIPTION OF THE DRAWINGS

Other objects and advantages of the invention will become apparent upon reading the following detailed description and upon reference to the drawings, in which.

DESCRIPTION OF THE PREFERRED EMBODIMENT

Before entering into a discussion of the preferred embodiment, it is to be understood that the invention is not limited in its application to the details of construction and arrangement of parts illustrated in the accompanying drawings, since the invention is capable of other embodiments and being practiced and carried out in various ways. Also, it is to be understood that the phraseology or terminology employed herein is solely for the purpose of description.

Figure 1:
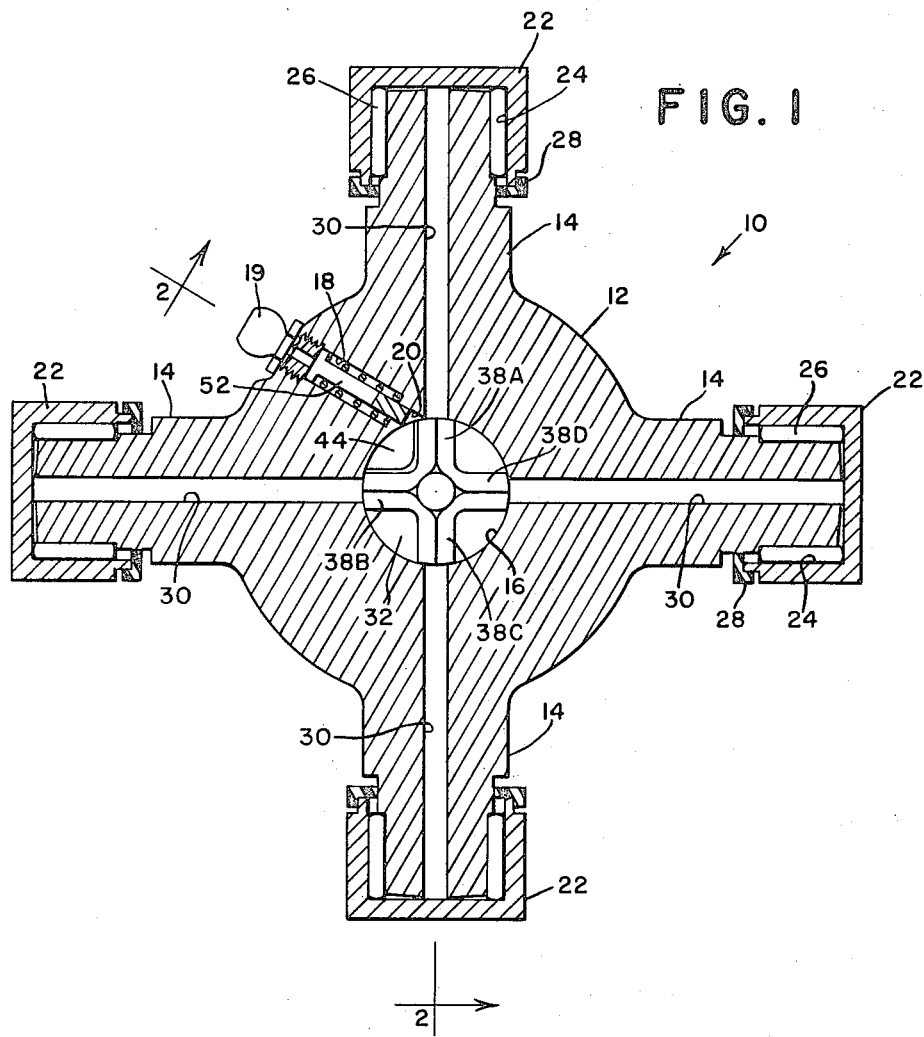
FIG. 1 is a cross sectional view of the universal joint spider of this invention.

Turning now to FIG. 1, there is shown the universal joint spider 10 of this invention which includes a central core member 12 and a plurality of equally spaced apart pins 14 extending from the core member. The core member is provided with a central annular recess 16 and a grease inlet port 18 extending from the outer surface of the core member to the central recess 16. Grease inlet port 18 has reached diametered portion 20 for purposes which will hereinafter become evident. A fitting 19 having a conventional check valve is provided in the outer end of the grease inlet port.

Rotatably received on the outer end of and surrounding each pin is a bearing housing 22 which cooperates with the pin to form a bearing chamber 24 which receives a plurality of bearings 26 in the conventional manner. An elastic seal 28 seals the chamber 24 and prevents the escapage of lubricating fluid during rotation of the spider. Lubricating ducts 30 are provided through each of the pins 14 from central recess 16 to the bearing chamber 24.

Figure 3A:
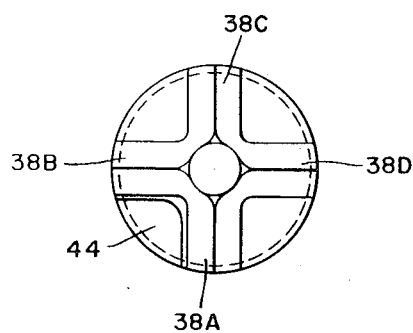
FIG. 3A is a top view of the lubrication duct selection member, an element of this invention.
Figure 3B:
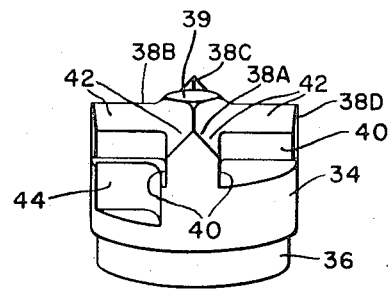
FIG. 3B is a perspective view of the lubrication duct selection member, an element of this invention.

Rotatably received within the central recess is a lubrication duct selection member 32, the configuration of which can best be visualized from viewing FIGS. 3A and 3B. A large diametered cylindrical midportion 34 carries on one end a coaxial smaller diametered annular portion 36, and on the opposite end equally spaced apart leg members 38A, 38B, 38C and 38D which extend transversely across midportion 34 from a common raised hub 39. Each of the leg members 38A, 38B, 38C and 38D includes vertical flat sidewalls 40 and is topped by cam surfaces 42 which are triangular shaped in cross section. Intermediate two of the legs, such as 38A and 38B, the cylindrical midportion 34 is provided with an open-ended notch forming a fluid chamber 44 which communicates with the space between leg members 38A and 38B.

Figure 2:
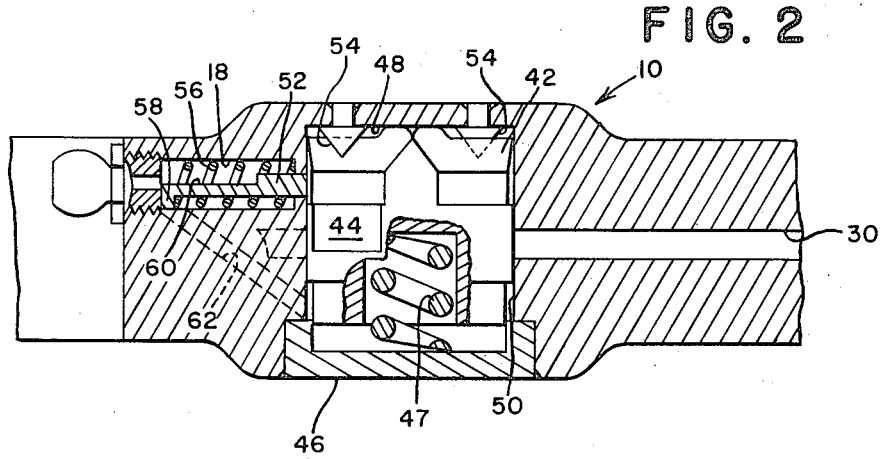
FIG. 2 is a cross sectional view of the universal joint spider of this invention taken along lines 2—2 of FIG. 1.
Figure 5:
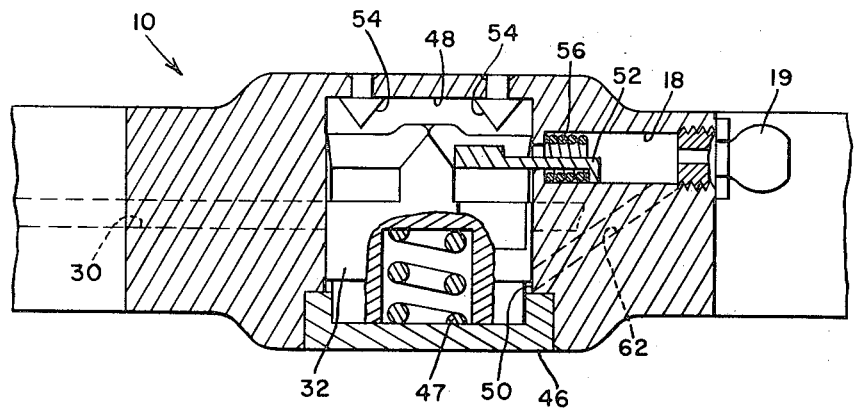
FIG. 5 is a cross sectional view taken along lines 5—5 of FIG. 4.

As can be seen in FIGS. 2 and 5, the selection member 32, in addition to being rotatably received in central recess 16, is also reciprocable between a first position wherein hub 39 bears against the inner flat wall of recess 16 and a second position wherein the reduced diametered portion 36 bears against the inner surface of a cap member 46 which closes central recess 16. A spring 47 normally biases the selection member 32 toward the first position.

Cylindrical midportion 34 is closely fitted in central recess 16 and the small diametered portion 36 is snugly fitted against the inner annular wall of cap member 46. Thus the central recess is divided into fluid receptacles 48 and 50, the volumes of which vary as the selection member 32 reciprocates between the first and second positions. Due to the sung fit of midportion 34 against the annular wall defining recess 16, lubricating ducts 30 are blocked or sealed off from receiving grease unless the fluid chamber 44 is in communication with one of the lubricating ducts. Obviously, as the selection member 32 is rotated, the fluid chamber 44 alternately fluidly communicates with successive lubricating ducts 30.

Movement of the selection member 32 in both a rotary and reciprocal fashion is induced by the cooperative efforts of a plunger 52 and conical-shaped cam surfaces 54 acting on legs 38A, 38B, 38C and 38D and cam surfaces 42. Plunger 52 has a diameter which assures a close fit within reduced diametered portion 20 of the grease inlet port 18. This close fit seals off the grease inlet port from central recess 16 when the plunger 52 is in a retracted position as shown in FIG. 2. A spring 56 bearing against an outwardly depending flange 58 on the plunger 52 normally biases the plunger 52 towards the retracted position. Plunger 52 further includes a longitudinal channel 60 which extends from depending flange 58 along a portion of the length of the plunger 52. Hence, grease entering the inlet port 18 through fitting 19 forces the plunger 52 inwardly until channel 60 opens into central recess 16 thereby putting the grease inlet port in fluid communication with the central recess.

Conical-shaped cam surfaces 54 are rigidly fastened to the core member 12 and project into the central recess 16. Even though one conical-shaped cam surface 54 would suffice, it has been found that it is advantageous to have two such surfaces spaced 180° apart. The conical-shaped surfaces are so positioned within recess 16 for engagement with cam surfaces 42 on legs 40 that when the selection member 32 is urged toward the first position by the spring 47, one of the legs of the selection member 32 is positioned as shown in FIG. 1, and hence adapted for engagement with the plunger 52.

Figure 4:
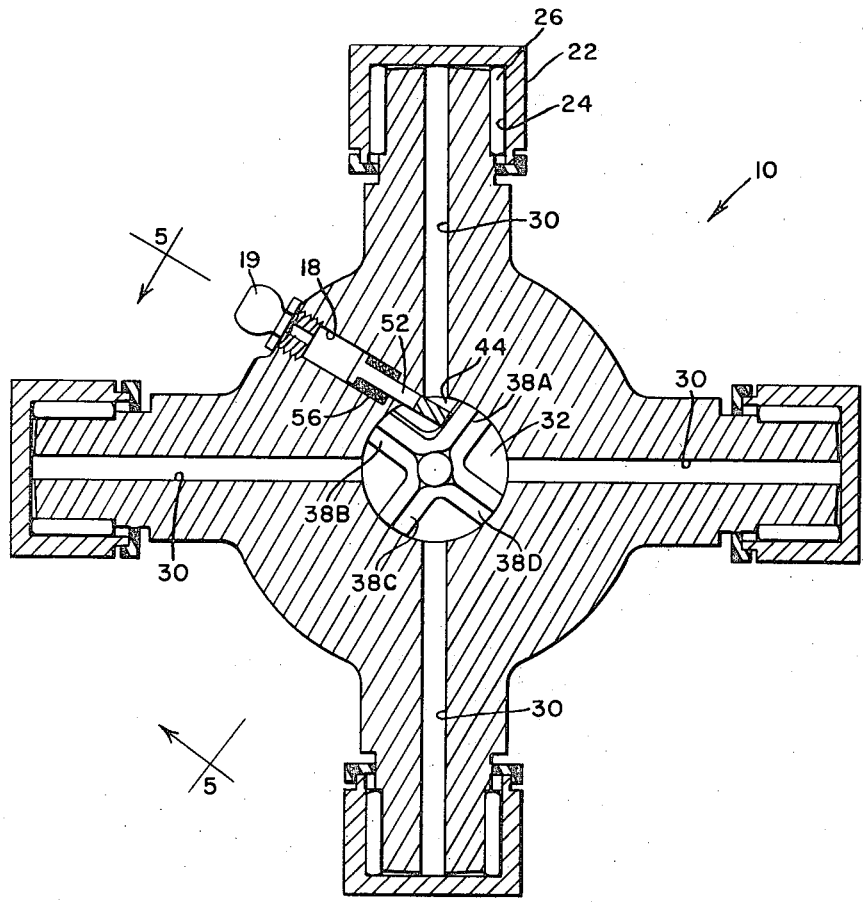
FIG. 4 is a cross sectional view of the universal joint spider of this invention showing the lubrication duct selection member after it has been rotated through an arc.

The operation of the device can best be understood by commencing the discussion of the sequential steps with the selection member 32 in the position depicted in FIGS. 1 and 2 of the drawings; that is with the selection member in the first position and one of the legs such as 38A properly placed for engagement with plunger 52. This is the position that the selection member 32 assumes when the spider is not being lubricated. At the commencement of the lubricating cycle, grease from an external source (not shown), affixed to fitting 19 in the conventional manner, unseats the check valve within the fitting and flows into grease inlet port 18. The pressure created by this grease overcomes the biasment of spring 56 thereby forcing plunger 52 inwardly. The plunger 52 on its inward movement, engages leg member 38A and upon further inward movement, rotates the lubrication selection member to the angular position shown in FIG. 4. As channel 60 opens into central recess 16, the pressure on plunger 52 is reduced to abrogate further movement of the plunger 52. Consequently, the rotary movement of the selection member will also be interrupted. The length of travel of plunger 52 is preselected such that the arc through which the selection member 32 rotates places the selection member 32 in the position shown in FIG. 4 and which is sufficient to place the fluid chamber 44 in fluid communication with one of the lubricating ducts 30.

Figure 6A:
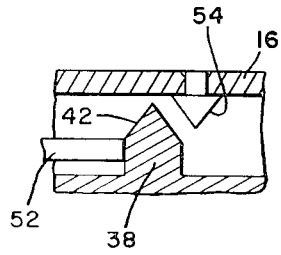
FIGS. 6A, 6B and 6C show the action of the cam surfaces, elements of this invention as the lubrication duct selection member is rotated.
Figure 6B:
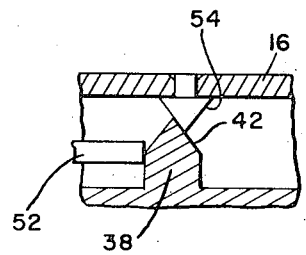
Figure 6C:
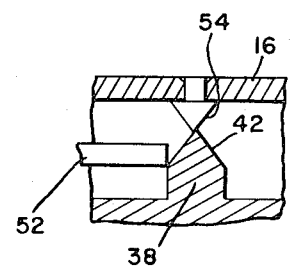

As can be visualized in the progressive movement of the selection member 32 shown in FIGS. 6A, 6B and 6C, simultaneously with the latter portion of the rotary movement, cam surfaces 42 on the leg member 38 bear against the conical-shaped cams 54 to effect axial movement of the selection member from the first position shown in FIG. 2 to the second position shown in FIG. 5. It should be noted that at the finish of the plunger-effected movement, the cam surface 42 as is shown in FIG. 6C overrides the tip of the conical-shaped cam 54; by override it is meant that the apex of the cam surface 42 passes beyond the tip of the conical-shaped cam surface 54 so that movement of the selection member 32 in the direction from the second to the first position will induce rotation of the selection member 32 in the same direction as plungerinduced movement.

With the selection member 32 in the second position, fluid chamber 44 on the selection member 32 is in communication with one of the ducts 30 while the remaining ducts are fluidly blocked by the large diametered midportion 34 of the selection member 32. Since the plunger 52 at this time is fully extended inwardly, grease can flow through channel 60 into central recess 16 and from the central recess through the fluid chamber into the duct which is in fluid communication therewith, and finally into the bearing chamber 24.

When the first bearing chamber has been sufficiently lubricated, the external grease pressure force is removed to permit retracting of plunger 52 into the grease inlet port 18 under the biasment of the spring 56. Since the check valve in fitting 19 closes, an egress route must be provided for grease within port 18 displaced by this retracting movement of plunger 52. This is accomplished by a passageway 62 between grease inlet port 18 and fluid receptacle 50. As can be appreciated from viewing FIG. 2, the volume of receptacle 50 is variable and increases as the selection member 32 moves from the second to the first position and diminishes as the selection member 32 moves from the first to the second position.

As the plunger 52 retracts into grease inlet port 18, spring 47 forces the selection member 32 from the second reciprocal position to the first position. Concurrently with this movement, cam surfaces 42 acting on conical cams 54 effect further rotation of the selection member 32. Since fluid chamber 44 remains in communication with the bearing chamber just greased during a substantial portion of this rotary movement of the selection member 32, grease displaced from fluid receptacle 48 as the selection member 32 moves from the second to the first position is pushed into the lubricating duct feeding the just greased bearing chamber.

When the selection member 32 has returned to its first reciprocal position, it will have rotated through a 90° arc and the first cycle of the greasing operation will have been completed. At this time leg 38B will have assumed the position in which leg 38A is shown in FIG. 1 and will be positioned for engagement with the plunger 52 on the next inward stroke thereof.

The cycle can then be repeated to index the fluid chamber 44 to the next lubricating duct 30 for enabling greasing of the succeeding bearing chamber 24 and so on until all of the bearing chambers 24 have been lubricated.

Thus, it is apparent that there has been provided in accordance with the invention, a universal joint spider that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the scope and spirit of the appended claims.

I claim:

1. A universal joint spider comprising:
  a. a core member provided with a central recess and a grease inlet port from the exterior of the core member to said recess for receiving grease from an external source;
  b. a plurality of pins extending outwardly from said core member transverse to the axis of rotation; each pin provided with a lubricating duct in communication with said recess;
  c. a bearing housing rotatably carried on the outer end of each pin; each of said housings and its respective pin cooperating to define a bearing chamber located between the bearing housing and pin and in communication with the lubricating duct within said pins;
  d. a lubrication duct selection member received within said recess and positionable to alternately fluidly connect successive lubricating ducts with said grease inlet port while fluidly blocking the remaining ducts from the grease inlet port; and
  e. means for automatically positioning said lubrication duct selection member to alternately, fluidly connect successive lubricating ducts with said grease inlet port while fluidly blocking the remaining lubricating ducts in response to successive lubricant pressure applied and released cycles whereby said grease chambers can be individually greased.

2. A universal joint spider as in claim 1 wherein said lubrication duct selection member is rotatable about an axis of rotation of said spider and reciprocally movable between a first and second position; said lubrication duct selection member being normally biased toward said first position and responsive to grease pressure to move to said second position; said lubrication duct selection member being further provided with a fluid chamber for selectively establishing, when properly positioned, fluid communication between the grease inlet port and individual lubricating ducts; and wherein said means for positioning said lubrication duct selection member comprises:
  a. cam surfaces acting between said core member and said lubrication duct selection member to rotatably index said selection member to position said fluid chamber intermediate two of said lubricating ducts as the lubrication selection member moves to said first position whereby fluidly blocking all of the ducts from the grease inlet port; and
  b. a plunger member adapted to rotate said lubrication member when same moves from said first to said second position to fluidly connect said fluid chamber with one of said lubricating ducts such that fluid communication is established between said grease inlet port and an individual lubrication duct via said fluid chamber.

3. A universal joint spider as in claim 2 wherein said plunger member is received in said grease inlet port for reciprocal movement; said plunger being normally biased outwardly and responsive to grease pressure to move inwardly to rotate said lubrication selection member.

4. A universal joint spider as in claim 2 wherein said cam surfaces comprise:
  a. at least one conical-shaped cam extending inwardly into said central recess from the inner surface of said core member; and
  b. a plurality of complementary shaped cam follower surfaces on said lubrication selection member facing said conical-shaped cam; at least one of said cam followers engaging said conical-shaped cam as the lubrication member moves from the second to the first position to index said lubrication selection member.

5. A universal joint spider including a core member, a plurality of journal pins extending from the core member, a central recess formed in the core member, a grease inlet port extending from the exterior of the core member to the recess, and a lubrication duct provided in each pin in communication with the recess, said universal joint spider being characterized in that:

a. a lubrication duct selection member is mounted in the recess for reciprocal movement between a first position and a second position, and for rotary movement to alternately fluidly connect successive ones of the lubricating ducts with the inlet port when in the second position;
  b. spring means normally biasing the selection member to the first position;
  c. the lubrication selection member and recess forming a servo chamber responsive to grease pressure to move the selection member to the second position;
  d. cam means acting between the core member and selection member to rotate the selection member to a position between the lubricating ducts upon movement of the selection member to the first position; and e. pressure-responsive plunger means reciprocally mounted within the inlet port for projection into the recess and engagement with the selection member to rotate the selection member to provide fluid communication between the inlet port and next successive lubricating ducts as grease under pressure is introduced into the inlet port.

* * * * *